(12) United States Patent
Jarvis et al.

(10) Patent No.: US 9,842,202 B2
(45) Date of Patent: Dec. 12, 2017

(54) DEVICE PROXIMITY (71) Applicant: Qualcomm Technologies International, Ltd., Cambridge (GB)

(72) Inventors: Murray Robert Jarvis, Cambridge (GB); Nicolas Guy Albert Graube, Barrington (GB); Robin Heydon, Cottenham (GB); Nicholas John Jones, Cambridge (GB); David Huntingford, Scottsdale, AZ (US); Hugo Mark Tyson, Cambridge (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 163 days.

(21) Appl. No.: 14/505,454

(22) Filed: Oct. 2, 2014

(65) Prior Publication Data
US 2015/0245231 A1    Aug. 27, 2015

(30) Foreign Application Priority Data

Feb. 25, 2014 (GB) .................................. 1403312.0
Feb. 25, 2014 (GB) .................................. 1403314.6
(Continued)

(51) Int. Cl.
*H04W 40/24* (2009.01)
*H04W 76/02* (2009.01)
(Continued)

(52) U.S. Cl.
CPC ......... *G06F 21/44* (2013.01); *G06Q 10/0833* (2013.01); *H04B 7/14* (2013.01);
(Continued)

(58) Field of Classification Search
None
See application file for complete search history.

(56) References Cited

U.S. PATENT DOCUMENTS

| 6,917,974 B1 | 7/2005 | Stytz et al. |
| 6,986,046 B1 | 1/2006 | Tuvell et al. |
| (Continued) | | |

FOREIGN PATENT DOCUMENTS

| CN | 102761941 A | 10/2012 |
| CN | 102984798 A | 3/2013 |
| (Continued) | | |

OTHER PUBLICATIONS

Chiang et al., "Neighborhood-Aware Density Control in Wireless Sensor Networks," 2008 IEEE International Conferences on Sensor Networks, Ubiquitous, and Trustworthy Computing, 8 pages.
(Continued)

*Primary Examiner* — Ayaz Sheikh
*Assistant Examiner* — Mariela Vidal Carpio
(74) *Attorney, Agent, or Firm* — Paradice and Li LLP (57) ABSTRACT

A method of determining the proximity of a first device to a second device, the method comprising, at the second device: receiving a first packet having a first payload and a first lifetime value, the first lifetime value being such so as to cause a device receiving the first packet to not retransmit the first payload; and generating, in dependence on the first packet, a second packet having a second payload and a second lifetime value, the second payload being indicative of the proximity of the first device to the second device and the second lifetime value being such as to cause a device receiving the second packet to retransmit the second payload.

18 Claims, 2 Drawing Sheets

(30) Foreign Application Priority Data

| Mar. 31, 2014 | (GB) | ................................ | 1405785.5 |
| Mar. 31, 2014 | (GB) | ................................ | 1405786.3 |
| Mar. 31, 2014 | (GB) | ................................ | 1405789.7 |
| Mar. 31, 2014 | (GB) | ................................ | 1405790.5 |
| Mar. 31, 2014 | (GB) | ................................ | 1405791.3 |
| Mar. 31, 2014 | (GB) | ................................ | 1405797.0 |
| Jul. 17, 2014 | (GB) | ................................ | 1412720.3 |

(51) Int. Cl.

| H04W 84/18 | (2009.01) |
| H04L 12/751 | (2013.01) |
| H04L 12/26 | (2006.01) |
| H04L 12/24 | (2006.01) |
| G06F 21/44 | (2013.01) |
| H04L 9/08 | (2006.01) |
| H04B 7/14 | (2006.01) |
| H04L 12/801 | (2013.01) |
| H04L 12/933 | (2013.01) |
| H04L 29/08 | (2006.01) |
| G06Q 10/08 | (2012.01) |
| H04W 4/02 | (2009.01) |
| H04L 5/00 | (2006.01) |
| H04W 4/06 | (2009.01) |
| H04L 29/06 | (2006.01) |
| H04W 12/06 | (2009.01) |
| H04W 16/18 | (2009.01) |
| H04W 52/38 | (2009.01) |
| H04W 4/00 | (2009.01) |
| H04W 24/06 | (2009.01) |
| H04W 52/02 | (2009.01) |
| H04H 20/71 | (2008.01) |
| H04W 72/12 | (2009.01) |
| H04W 88/06 | (2009.01) |
| H04W 12/04 | (2009.01) |

(52) U.S. Cl.
CPC ........... *H04H 20/71* (2013.01); *H04L 5/0055* (2013.01); *H04L 9/0861* (2013.01); *H04L 41/082* (2013.01); *H04L 41/14* (2013.01); *H04L 43/065* (2013.01); *H04L 43/0817* (2013.01); *H04L 43/0852* (2013.01); *H04L 43/0882* (2013.01); *H04L 43/10* (2013.01); *H04L 45/02* (2013.01); *H04L 47/115* (2013.01); *H04L 47/16* (2013.01); *H04L 49/1584* (2013.01); *H04L 63/061* (2013.01); *H04L 63/08* (2013.01); *H04L 63/0853* (2013.01); *H04L 67/30* (2013.01); *H04L 69/22* (2013.01); *H04W 4/008* (2013.01); *H04W 4/028* (2013.01); *H04W 4/06* (2013.01); *H04W 12/06* (2013.01); *H04W 16/18* (2013.01); *H04W 24/06* (2013.01); *H04W 40/24* (2013.01); *H04W 52/0251* (2013.01); *H04W 52/38* (2013.01); *H04W 72/12* (2013.01); *H04W 76/021* (2013.01); *H04W 76/023* (2013.01); *H04W 84/18* (2013.01); *H04W 88/06* (2013.01); *H04W 12/04* (2013.01); *Y02B 60/50* (2013.01)

(56) References Cited

U.S. PATENT DOCUMENTS

| 7,522,540 | B1 | 4/2009 | Maufer |
| 7,778,270 | B1 | 8/2010 | Zhang et al. |
| 7,787,427 | B1 | 8/2010 | Simon et al. |
| 8,495,618 | B1 | 7/2013 | Inbaraj et al. |
| 8,516,269 | B1 | 8/2013 | Hamlet et al. |
| 8,681,671 | B1 | 3/2014 | Hui et al. |
| 8,938,792 | B2 | 1/2015 | Koeberl et al. |
| 8,953,790 | B2 | 2/2015 | Qi et al. |
| 2002/0119770 | A1 | 8/2002 | Twitchell |
| 2003/0014507 | A1 | 1/2003 | Bertram et al. |
| 2003/0037237 | A1 | 2/2003 | Baldwin et al. |
| 2003/0163554 | A1 | 8/2003 | Sendrowicz |
| 2003/0181203 | A1 | 9/2003 | Cheshire |
| 2004/0246911 | A1 | 12/2004 | Bonsma et al. |
| 2005/0036469 | A1 | 2/2005 | Wentink |
| 2005/0113102 | A1 | 5/2005 | Kwon et al. |
| 2005/0175184 | A1 | 8/2005 | Grover et al. |
| 2005/0246533 | A1 | 11/2005 | Gentry |
| 2005/0249137 | A1 | 11/2005 | Todd et al. |
| 2006/0025180 | A1 | 2/2006 | Rajkotia et al. |
| 2006/0034233 | A1 | 2/2006 | Strutt et al. |
| 2006/0041653 | A1 | 2/2006 | Aaron |
| 2006/0135064 | A1 | 6/2006 | Cho et al. |
| 2006/0154598 | A1 | 7/2006 | Rudland et al. |
| 2006/0156390 | A1 | 7/2006 | Baugher |
| 2006/0209584 | A1 | 9/2006 | Devadas et al. |
| 2006/0212938 | A1 | 9/2006 | Suzuki |
| 2006/0245424 | A1 | 11/2006 | Ramanathan et al. |
| 2006/0268742 | A1* | 11/2006 | Chu ..................... H04L 41/12 370/254 |
| 2006/0268749 | A1 | 11/2006 | Rahman et al. |
| 2007/0025274 | A1* | 2/2007 | Rahman ............... H04W 40/26 370/254 |
| 2007/0097895 | A1 | 5/2007 | Keshavarzian et al. |
| 2007/0105542 | A1 | 5/2007 | Friedman |
| 2007/0110024 | A1 | 5/2007 | Meier |
| 2007/0127421 | A1 | 6/2007 | D'Amico et al. |
| 2007/0206537 | A1 | 9/2007 | Cam-Winget et al. |
| 2007/0211654 | A1 | 9/2007 | Kim et al. |
| 2007/0211736 | A1 | 9/2007 | Sapek et al. |
| 2007/0247303 | A1 | 10/2007 | Payton |
| 2007/0280136 | A1* | 12/2007 | Chen ..................... H04L 45/18 370/254 |
| 2007/0280137 | A1 | 12/2007 | Bahr et al. |
| 2007/0281721 | A1 | 12/2007 | Lee et al. |
| 2008/0013947 | A1 | 1/2008 | Peloso et al. |
| 2008/0069030 | A1 | 3/2008 | Hirano et al. |
| 2008/0095059 | A1 | 4/2008 | Chu et al. |
| 2008/0205385 | A1 | 8/2008 | Zeng et al. |
| 2008/0279155 | A1 | 11/2008 | Pratt, Jr. et al. |
| 2008/0291855 | A1* | 11/2008 | Bata ..................... H04W 84/18 370/311 |
| 2008/0292105 | A1 | 11/2008 | Wan et al. |
| 2009/0054033 | A1* | 2/2009 | Pratt, Jr. ................ G01D 21/00 455/410 |
| 2009/0067373 | A1 | 3/2009 | Kneckt et al. |
| 2009/0089408 | A1* | 4/2009 | Bou-Diab ............. H04L 45/02 709/220 |
| 2009/0216349 | A1 | 8/2009 | Kwon et al. |
| 2009/0222659 | A1 | 9/2009 | Miyabayashi et al. |
| 2009/0232037 | A1 | 9/2009 | Dixit et al. |
| 2009/0274173 | A1 | 11/2009 | Wentink |
| 2009/0279518 | A1 | 11/2009 | Falk et al. |
| 2009/0307483 | A1 | 12/2009 | Falk et al. |
| 2009/0312023 | A1 | 12/2009 | Kazmi |
| 2010/0005294 | A1 | 1/2010 | Kostiainen et al. |
| 2010/0046439 | A1 | 2/2010 | Chen et al. |
| 2010/0061272 | A1 | 3/2010 | Veillette |
| 2010/0100940 | A1 | 4/2010 | Reynolds |
| 2010/0141406 | A1 | 6/2010 | Jo et al. |
| 2010/0149028 | A1 | 6/2010 | Mermet et al. |
| 2010/0191968 | A1 | 7/2010 | Patil et al. |
| 2010/0202345 | A1 | 8/2010 | Jing et al. |
| 2010/0205281 | A1 | 8/2010 | Porter et al. |
| 2010/0208621 | A1* | 8/2010 | Morper ............... H04L 41/0853 370/255 |
| 2010/0241857 | A1 | 9/2010 | Okude et al. |
| 2010/0246460 | A1 | 9/2010 | Kholaif et al. |
| 2010/0260146 | A1 | 10/2010 | Lu |
| 2010/0262828 | A1 | 10/2010 | Brown et al. |
| 2011/0003547 | A1 | 1/2011 | Oh et al. |
| 2011/0053493 | A1 | 3/2011 | Yanagihara |
| 2011/0081860 | A1 | 4/2011 | Brown et al. |

(56) References Cited

U.S. PATENT DOCUMENTS

| | | |
|---|---|---|
| 2011/0099368 A1 | 4/2011 | Koh |
| 2011/0121654 A1 | 5/2011 | Recker et al. |
| 2011/0128884 A1 | 6/2011 | Reynaud et al. |
| 2011/0149999 A1 | 6/2011 | Kamito et al. |
| 2011/0164512 A1 | 7/2011 | Citrano, III et al. |
| 2011/0216695 A1 | 9/2011 | Orth |
| 2012/0087290 A1 | 4/2012 | Rhee et al. |
| 2012/0087292 A1 | 4/2012 | Grimm et al. |
| 2012/0163292 A1 | 6/2012 | Kneckt et al. |
| 2012/0182860 A1 | 7/2012 | Liu et al. |
| 2012/0195231 A1 | 8/2012 | Fonseca et al. |
| 2012/0196534 A1 | 8/2012 | Kasslin et al. |
| 2012/0198434 A1 | 8/2012 | Dirstine et al. |
| 2012/0198435 A1 | 8/2012 | Dirstine et al. |
| 2012/0252405 A1 | 10/2012 | Lortz et al. |
| 2012/0263072 A1 | 10/2012 | Wu |
| 2013/0016654 A1 | 1/2013 | Mayo et al. |
| 2013/0029685 A1 | 1/2013 | Moshfeghi |
| 2013/0051552 A1 | 2/2013 | Handschuh et al. |
| 2013/0064175 A1 | 3/2013 | Pandey et al. |
| 2013/0065584 A1 | 3/2013 | Lyon et al. |
| 2013/0067222 A1 | 3/2013 | Munger et al. |
| 2013/0070745 A1 | 3/2013 | Nixon et al. |
| 2013/0080765 A1 | 3/2013 | Mohanty et al. |
| 2013/0107909 A1 | 5/2013 | Jones et al. |
| 2013/0128809 A1 | 5/2013 | Wentink et al. |
| 2013/0130622 A1 | 5/2013 | Yang et al. |
| 2013/0198305 A1* | 8/2013 | Veillette .................. H04L 51/00 709/206 |
| 2013/0215900 A1 | 8/2013 | Jogadhenu |
| 2013/0219482 A1 | 8/2013 | Brandt |
| 2013/0227336 A1* | 8/2013 | Agarwal ............. H04L 43/0811 714/4.3 |
| 2013/0242929 A1 | 9/2013 | Goergen et al. |
| 2013/0279409 A1 | 10/2013 | Dublin, III et al. |
| 2013/0279410 A1* | 10/2013 | Dublin, III ............ H04W 40/02 370/328 |
| 2013/0301471 A1* | 11/2013 | Brown ................ H04W 40/248 370/254 |
| 2014/0025806 A1* | 1/2014 | Robitaille ............... H04L 41/12 709/224 |
| 2014/0044016 A1 | 2/2014 | Rahman |
| 2014/0047260 A1 | 2/2014 | Iijima |
| 2014/0064261 A1 | 3/2014 | Wang et al. |
| 2014/0089912 A1 | 3/2014 | Wang et al. |
| 2014/0108786 A1 | 4/2014 | Kreft |
| 2014/0111234 A1 | 4/2014 | Laackmann et al. |
| 2014/0112470 A1 | 4/2014 | Shen et al. |
| 2014/0167912 A1 | 6/2014 | Snyder et al. |
| 2014/0169174 A1 | 6/2014 | Gilson |
| 2014/0171062 A1* | 6/2014 | Fallgren ................ H04W 40/22 455/422.1 |
| 2014/0181172 A1 | 6/2014 | Elliott |
| 2014/0189790 A1 | 7/2014 | Mindler et al. |
| 2014/0266669 A1 | 9/2014 | Fadell et al. |
| 2014/0337607 A1 | 11/2014 | Peterson et al. |
| 2015/0010153 A1* | 1/2015 | Robertson ............. H04W 12/02 380/270 |
| 2015/0019892 A1 | 1/2015 | Agrawal et al. |
| 2015/0052351 A1 | 2/2015 | Nodehi Fard Haghighi et al. |
| 2015/0058409 A1 | 2/2015 | Wang |
| 2015/0121108 A1 | 4/2015 | Agrawal et al. |
| 2015/0143130 A1 | 5/2015 | Ducharme et al. |
| 2015/0195692 A1 | 7/2015 | Chow et al. |
| 2015/0242614 A1 | 8/2015 | Scagnol et al. |
| 2015/0244481 A1 | 8/2015 | Tyson et al. |
| 2015/0244484 A1 | 8/2015 | Tyson et al. |
| 2015/0244565 A1* | 8/2015 | Heydon .............. H04L 43/0817 709/221 |
| 2015/0244623 A1 | 8/2015 | Heydon et al. |
| 2015/0244648 A1 | 8/2015 | Tyson et al. |
| 2015/0244828 A1 | 8/2015 | Heydon |
| 2015/0245179 A1 | 8/2015 | Jarvis et al. |
| 2015/0245182 A1 | 8/2015 | Scagnol et al. |
| 2015/0245203 A1 | 8/2015 | Tyson et al. |
| 2015/0245204 A1 | 8/2015 | Heydon |
| 2015/0245220 A1 | 8/2015 | Williamson et al. |
| 2015/0245296 A1 | 8/2015 | Tyson et al. |
| 2015/0245351 A1 | 8/2015 | Banerjea et al. |
| 2015/0245369 A1 | 8/2015 | Heydon |
| 2015/0245412 A1 | 8/2015 | Tyson et al. |
| 2015/0326444 A1* | 11/2015 | Smith .................... H04L 45/02 370/254 |

FOREIGN PATENT DOCUMENTS

| | | |
|---|---|---|
| EP | 1496668 A1 | 1/2005 |
| EP | 1780951 A2 | 5/2007 |
| EP | 1886450 B1 | 2/2008 |
| EP | 2306692 A1 | 4/2011 |
| GB | 2464125 A | 4/2010 |
| JP | 2007124148 A | 5/2007 |
| WO | 02078272 A1 | 10/2002 |
| WO | 03026224 A1 | 3/2003 |
| WO | 2004004230 A1 | 1/2004 |
| WO | WO-2004104850 A1 | 12/2004 |
| WO | 2007013914 A1 | 2/2007 |
| WO | 2008004102 A2 | 1/2008 |
| WO | 2008013878 A1 | 1/2008 |
| WO | 2009082151 A2 | 7/2009 |
| WO | 2009088887 A2 | 7/2009 |
| WO | 2010036885 A2 | 4/2010 |
| WO | 2010/089737 A1 | 8/2010 |
| WO | 2011043755 A1 | 4/2011 |
| WO | 2012064178 A1 | 5/2012 |
| WO | 2013010427 A | 1/2013 |
| WO | 2013028404 A1 | 2/2013 |
| WO | 2013057666 A1 | 4/2013 |
| WO | 2014/000163 A1 | 1/2014 |
| WO | WO-2014105893 A1 | 7/2014 |

OTHER PUBLICATIONS

Balachandran et al., "Adaptive Sleeping and Awakening Protocol (ASAP) for Energy Efficient Adhoc Sensor Networks," 2005 IEEE, 7 pages.

Search Report for DE Application 10 2014 012 258.1 dated Mar. 2, 2015 (12 pages).

Search Report for DE Application 10 2014 012 518.1 dated Feb. 27, 2015 (14 pages).

Search Report for DE Application 10 2014 012 615.3 dated Jan. 27, 2015 (6 pages).

Search Report for GB Application 1405790.5 dated Oct. 14, 2014 (5 pages).

Search Report for GB Application 1403312.0 dated Jun. 25, 2014 (3 pages).

Search Report for GB Application 1405786.3 dated Jul. 17, 2014 (3 pages).

Search Report for GB Application 1415178.1 dated Sep. 25, 2014 (5 pages).

Search Report for GB Application 1405797.0 dated Sep. 2, 2014 (3 pages).

Search Report for GB Application 1405789.7 dated Sep. 26, 2014 (4 pages).

Search Report for GB Application 1405797.0 dated Jul. 17, 2014 (4 pages).

Search Report for GB Application 1415177.3 dated Sep. 10, 2014 (4 pages).

Search Report for DE Application 10 2014 012 257.3 dated Jan. 27, 2015 (7 pages).

Search Report for DE Application 10 2014 012 616.1 dated Feb. 3, 2015 (6 pages).

Search Report for GB Application 1412715.3 dated Jan. 8, 2015 (3 pages).

Search Report for GB Application 1412722.9 dated Jan. 13, 2015 (6 pages).

Search Report for GB Application 1501943.3 dated Mar. 20, 2015 (4 pages).

(56) References Cited

OTHER PUBLICATIONS

Search report for application No. GB1405789.7 dated Jul. 24, 2014, 4 pages.
Schutz K: "Trusted Platforms for Homeland Security", Atmel white paper, Copyright 2004, pp. 1-8, http://www.atmel.com/images/doc5062.pdf.

* cited by examiner

DEVICE PROXIMITY

CROSS REFERENCE TO RELATED APPLICATIONS

This non-provisional patent application claims priority to Great Britain applications: GB 1412720.3, filed Jul. 17, 2014; GB 1405790.5, filed Mar. 31, 2014; GB 1403314.6, filed Feb. 25, 2014; GB 1405785.5, filed Mar. 31, 2014; GB 1405786.3, filed Mar. 31, 2014; GB 1405789.7, filed Mar. 31, 2014; GB 1403312.0, filed Feb. 25, 2014; GB 1405791.3, filed Mar. 31, 2014; GB 1405797.0, filed Mar. 31, 2014.

TECHNICAL FIELD

This invention relates to determining the proximity of a wireless communications device.

BACKGROUND

There is an increasing need for a variety of objects to be equipped with the ability to send and receive messages. In the case of a home, for example, it may be desired that the objects in a room be capable of communicating with each other, and also potentially to be able to communicate with the internet or cloud. For example, the room may have a light, light switch, window and door. It may be desired that each of these objects be able to communicate with the others so that the home can be automated.

To enable objects to communicate, they may be equipped with a communication device that can communicate with similar communication devices attached to other objects. For this type of architecture, a large number of objects may be able to communicate with each other. The result can be a network of many communication devices, each associated with a respective object. As many of these objects may not have access to, or require, power themselves (for example, a window, door, packages sitting on a shelf, etc), there may be a desire for the devices that communicate on the objects' behalf to be battery-powered devices that consume only a small amount of power. It may also be desirable that these devices be able to communicate wirelessly with each other so that there is no need for cables running between them.

One suitable method of communication for such a network is to use a mesh networking protocol. This permits a first device to send a message to a second device, which may be outside the communication range of the first device, by transmitting the message via one or more intermediate devices. Historically, mesh networking protocols are typically designed around the concept of devices sending messages using complex routing tables. Such complex routing requires processing power which tends to increase power consumption of the devices. Such mesh networking protocols also tend to operate according to proprietary protocols. This means devices have to be manufactured specifically for the task of communicating according to a particular mesh network. This may be undesirable because it increases the cost of devices that might be installed in a multitude locations and/or attached to a multitude of different devices.

Figure 1:
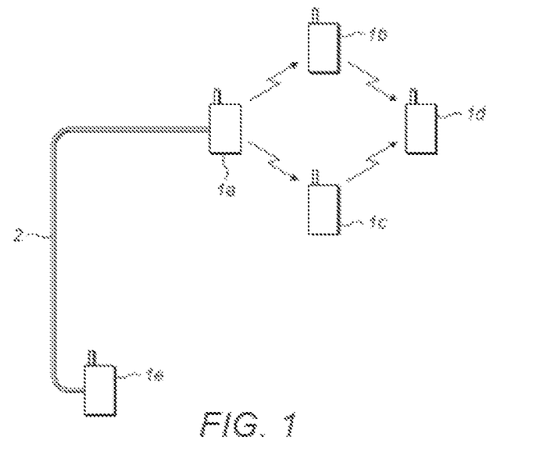
FIG. 1 shows a configuration including a mesh network.

FIG. 1 shows an example of a network. The network comprises a number of devices 1. Each device can communicate wirelessly with the other devices that are in effective range of it. The devices can propagate signals from one device to another via other devices. For example, if device 1a transmits a signal, that signal can be received by devices 1b and 1c which are within range of device 1a. Devices 1b and 1c can then relay the signal received from device 1a so that it can be received by device 1d which is out of range of device 1a. This method of communication allows devices to communicate even though they are out of direct range of each other.

FIG. 1 shows a further device 1e which is out of wireless range of all the devices 1a to 1d. In a basic mesh network none of the devices 1a to 1d can communicate with device 1e using the mesh protocol. However, they may be able to communicate with device 1e using some other protocol. For example, devices 1a and 1e might be connected to a wired network as illustrated at 2, and that pair of devices may be able to communicate over that wired network. The wired network might be expected to use a different protocol from the wireless protocol. A consequence of that is that device 1a cannot simply forward messages of the mesh protocol to device 1e, which makes communications with device 1e inconvenient.

Figure 2:
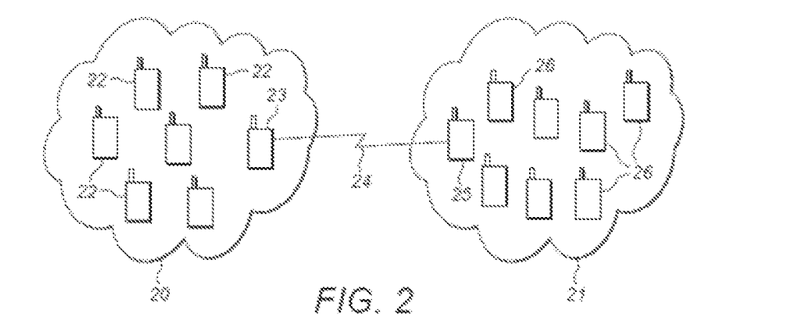
FIG. 2 shows bridged mesh networks.

FIG. 2 shows a communication system comprising two mesh networks 20, 21. The first mesh network 20 comprises a number of devices 22 and device 23 which can communicate in an ad hoc manner to transfer data between each other. One of those devices, 23, is capable of communicating via a link 24 with a device 25 in the second network 21. The link 24 uses a protocol other than the mesh protocol. In the second network 21, device 25 and devices 26 can communicate with each other in an ad hoc manner. Devices 23 and 25 are configured to relay messages of the mesh protocol from network 20 over link 24 and inject them into network 21, and vice versa. In this way devices 22, which have no direct means of communication with devices in network 21 can communicate with devices 25 and 26. Devices 23 and 25 serve to bridge or tunnel between networks 20 and 21.

It can be advantageous to control some behavioural aspects of a device connected to the mesh network. Some aspects of their behaviour could be changed, for example, in dependence on their surrounding environment. For example, it may be useful to have lights that are connected to the mesh network to be able to automatically switch themselves on or off as a user moves around a building. In another example, it may be useful for the mesh network to maintain a certain level of service that ensures messages can get from one device to another device even if some intermediate relaying devices are running low on power and less capable of relaying message. In those examples, it may be useful to have knowledge of the location (absolute or relative to other devices) of the mesh devices so that their behaviour can be appropriately controlled. Thus there is a need for a method of determining the proximity of devices to other devices in a mesh network.

SUMMARY OF THE INVENTION

According to a first aspect there is provided a method of determining the proximity of a first device to a second device, the method comprising, at the second device: receiving a first packet having a first payload and a first lifetime value, the first lifetime value being such so as to cause a device receiving the first packet to not retransmit the first payload; and generating, in dependence on the first packet, a second packet having a second payload and a second lifetime value, the second payload being indicative of the proximity of the first device to the second device and the second lifetime value being such so as to cause a device receiving the second packet to retransmit the second payload.

The payload of the second packet may comprise an identifier for the first device, an identifier for the second device and said indication of the proximity.

The second device may be configured to instruct one or more other devices to perform an action in dependence on said proximity indication.

The first and second devices may be in a network of devices comprising a third device, the method may further comprise, at the third device, receiving and analysing the first packet and a packet comprising said instruction and in dependence on said analysis, disregarding the instruction. At the third device and on disregarding the instruction, the method may further comprise generating and transmitting a third packet comprising a message indicating that the instruction has been disregarded.

The second packet may be generated in dependence on the proximity indication being above a predetermined proximity threshold.

The second packet may be generated in dependence on said proximity indication being below a predetermined proximity threshold and on not receiving a packet indicating the proximity of the first device to another device for a predetermined duration of time from receiving the first packet.

The method may further comprise, at the second device: receiving a third packet having a third payload and a third lifetime value in dependence on the first packet, the third payload being indicative of the proximity of the first device to a third device and the third lifetime value being such so as to cause a device receiving the third packet to retransmit the third payload; and processing the third payload so as to compare the indicated proximity of the first device to the third device with the indicated proximity of the first device with the second device. The method may further comprise, at the second device, generating and broadcasting a fourth packet in dependence on said comparison, the fourth packet comprising a payload configured to cause another device to perform a first action. The method may further comprise, at the second device, performing a second action in dependence on said comparison.

The first and second devices may be in a network of devices comprising a third device, the method may further comprise, at a third device: receiving the first packet comprising an identifier for the first device; and determining whether or not to generate a third packet in dependence on whether or not the third device receives the second packet, the third packet having a third payload and a third lifetime value in dependence on the first packet, the third payload being indicative of the proximity of the first device to the third device and the third lifetime value being such so as to cause a device receiving the third packet to retransmit the third payload.

The method may further comprise, at the second device, measuring a characteristic of the received first packet, said characteristic being at least one of signal strength, signal round-trip time, signal arrival time, signal quality and signal error.

The first and second devices may be capable of communicating in a mesh network.

The first and second devices may be capable of operating according to a wireless communications protocol, which defines a broadcast packet type. The method may further comprise, at the second device: receiving a first broadcast packet of the broadcast packet type, the broadcast packet comprising the first packet; and broadcasting a second broadcast packet of the broadcast packet type, the second broadcast packet comprising the second packet. The wireless communication protocol may be Bluetooth low energy.

According to a second aspect, there is provided a wireless communication device comprising: a transceiver configured to receive, from a first device, a first packet having a first payload and a first lifetime value, the first lifetime value being such so as to cause a device receiving the first packet to not retransmit the first payload; a processor configured to process the first packet and generate, in dependence on the first packet, a second packet having a second payload and a second lifetime value, the second payload being indicative of the proximity of the first device to the wireless communication device and the second lifetime value being such so as to cause a device receiving the second packet to retransmit the second payload.

According to a third aspect, there is provided a communications system comprising: a first device being configured to transmit a first packet having a first payload and a first lifetime value, the first lifetime value being such so as to cause a device receiving the first packet to not retransmit the first payload, and a second device being configured to receive the first packet and generate, in dependence on the first packet, a second packet having a second payload and a second lifetime value, the second payload being indicative of the proximity of the first device to the second device and the second lifetime value being such so as to cause a device receiving the second packet to retransmit the second payload.

The communications system may comprise a plurality of wireless nodes within a predetermined area and forming a mesh network, each node being associated with a region within said area, the second device being one of the plurality of wireless nodes, a particular node of the plurality of wireless nodes being configured to receive the second packet and perform an action in dependence on the second packet and the region associated with the particular node. The communications system may further comprise a management device capable of communicating in the mesh network, the management device configured to generate and transmit a third packet having a payload capable of causing devices associated with a particular region to perform a particular action.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present disclosure relates to wireless communication devices that are capable communicating as part of a mesh network, which operates according to a mesh protocol. In the examples described herein, the devices are capable of operating according to a mesh protocol that is implemented using a wireless communications protocol (e.g. such as Bluetooth low energy (BLE)). The operation of the devices according to a mesh protocol is described in the following paragraphs.

The devices are capable of communicating according to a wireless communications protocol that defines a broadcast packet type. The broadcast packet type is not defined by the wireless communications protocol as being addressed to any one particular device. This is because the broadcast packet type is transmitted according to a wireless communication protocol that is blind to the existence of the network structure that is present at the transport layer within the mesh network.

The mesh network is not defined by the wireless communication protocol. The wireless communication device uses the broadcast packet type according to the wireless communication protocol to send mesh network data packets. The mesh network data packets are suitably transport layer data packets. When the wireless communication device receives a data packet of the broadcast packet type, it checks whether the payload includes a mesh data packet. If so, it may check whether the mesh network data packet has been previously been received by the wireless communication device. If the packet has been previously received by the wireless communication device it can decide not to retransmit the mesh data packet. If the packet has not been previously received by the wireless communication device then, it checks a lifetime value of the mesh data packet to see if it is equal to a predetermined threshold value. If the lifetime value is not equal to the predetermined threshold value, then the device retransmits the mesh data packet within a broadcast packet type data packet. When retransmitting, the only portion of the mesh data packet that is altered is the lifetime value so that it reflects the fact that the packet has been received and retransmitted. Thus the payload of the mesh data packet is left unaltered when retransmitted. If the lifetime value is equal to the predetermined threshold value, however, the communication device does not retransmit the mesh data packet.

Figure 3:
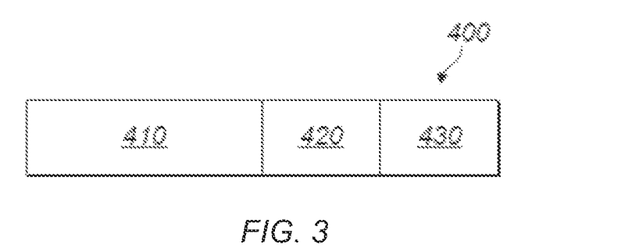
FIG. 3 illustrates an example mesh packet format.

FIG. 3 illustrates a format of an example mesh packet 400. The packet 400 may comprise a higher layer message field 410, a Message Authentication Code (MAC) field 420 and a Time-To-Live (TTL) field 430.

The packet 400 may be comprised within the payload of a broadcast packet, which may, for example be a Bluetooth low energy non-connectable undirected advertising packet. Packet 400 may be a mesh transport layer packet, which a device can process at the transport layer to enable the retransmission of the message throughout a network.

The higher layer message field 410 can comprise a message that is generated by one device to be sent to one or more other devices. The contents of the higher layer message may be intended for processing at a layer higher than the transport layer (e.g. at the application level) and so it may be opaque to the transport layer. The higher level message field 410 may comprise the ID of the sender and a serial number. The serial number can be unique to that particular sender. The pair of the sender-ID and the serial number can be used to uniquely identify a particular message within the mesh network. The higher layer message 410 may be considered to be the payload of the packet as it contains the information that is purpose of the transmission of the packet. For example, a light switch that is mesh device may wish to instruct a light that is also a mesh device to turn on and thus may generate an appropriate message for that light at an application layer. Packet 400 may then be formed with the application layer message being within the contents of the higher layer message 410. The payload of the mesh transport packet 400 can also be described as the static content of the mesh transport packet 400 because it is not altered as it is retransmitted throughout the mesh network.

The packet 400 may comprise a MAC 420 field that can be used to identify and authenticate the packet. The MAC may be computed based on the contents of the higher layer message field 410.

The TTL field 430 can generally be described as a lifetime field 430 that defines the lifetime of the mesh transport packet 400 within the mesh network. The lifetime field 430 of the mesh transport packet 400 can be used by a receiving device to determine whether the received mesh transport packet 400 should be retransmitted or not. When a device retransmits a packet 400, the device retransmits the packet with fields 410 and 420 identical to that of the content of the packet as it received it, except that it decrements the TTL value, e.g. by one. Each device is configured not to retransmit any mesh packets it receives with a TTL of zero. In that way the TTL serves to prevent messages circulating indefinitely in the mesh network. With this behaviour in mind, the original value of the TTL can be set depending on the properties of the network. A large or unreliable network may require a larger initial TTL value than a smaller, more reliable network. In other implementations the TTL could be interpreted in other ways: for example it could be incremented up to a pre-set limit at each retransmission.

In some situations, it can be desirable for devices in a mesh network (that can operate as described above) to be able to influence the behaviour and actions of other devices in the network. For some actions, it can be useful for a device to know about its surroundings and about its neighbouring devices. For example, as described in the example above, it can be useful for a group of mesh devices such as light bulbs to be able to determine the location of a user so that the light bulbs in the same room as the user can be switched on and the bulbs in other rooms can be switched off. The user may carry a device (such as a smartphone) that is capable communicating with devices in the mesh network. As described in more detail below, this would allow the mesh devices to detect the presence of the user in their surrounding environment and change their behaviour (and influence the behaviour of other devices) accordingly.

In another example, it can be useful for a mesh device that is in a fixed location to have knowledge of other neighbouring fixed mesh devices so that it can adjust its ability to retransmit mesh packets in accordance with the number of (and, preferably, reliability of) its neighbouring devices. This can help ensure that mesh packets are propagated throughout the network.

Figure 4:
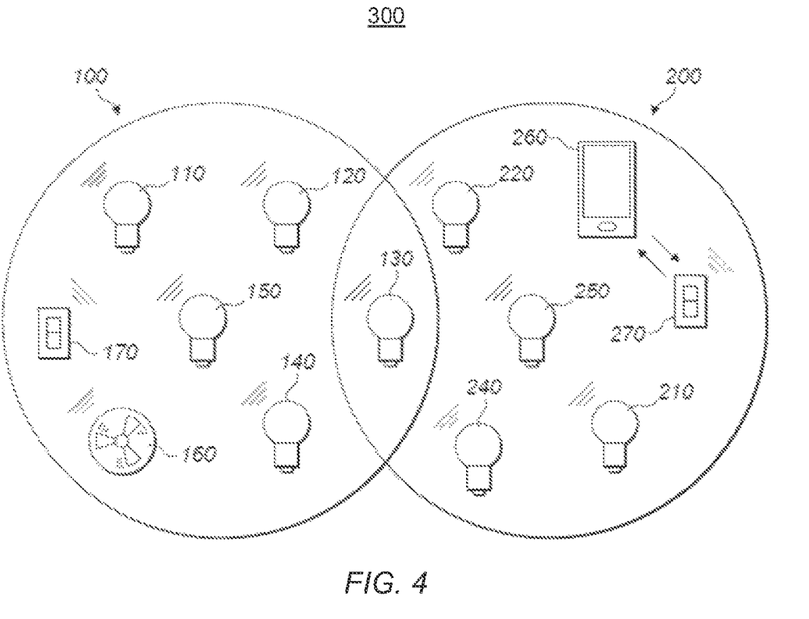
FIG. 4 shows a mesh network comprising a plurality of wireless communication devices.

FIG. 4 shows an example mesh network 300 that comprises a plurality of objects each equipped with a wireless communication device that enables the object to communicate using the mesh protocol. This mesh network 300 comprises lights 110, 120, 130, 140, 150, 210, 220, 240 and 250, a fan 160 and light switches 170 and 270 which are each equipped with a wireless communication device that enables communication over the mesh network 300.

A smartphone 260 may also be part of the mesh network 300 or capable of being detected by devices in the mesh network 300. The smartphone 260 may be portable and when it comes within range of a device in network 300, it may be detected, which can lead to devices in the network to perform certain actions, as described further below.

Some of the devices in the mesh network 300 may be in fixed physical locations and have regions associated with them. For example, lights 110, 120, 130, 140, 150, fan 160 and light switch 170 may be associated with a region, such as a first room 100 and lights 210, 220, 240, 250 and light switch 270 may be associated with another region, such as a second room 200. The region that a device belongs to may be stored at that device and/or at a mesh network management device such as the smartphone 260 and/or a server (not shown) that is capable of receiving and sending mesh messages (which may be done via a bridge, as described above with respect to FIG. 2).

A portable device, such as smartphone 260, may not be associated with a region as it able to move to various locations. The smartphone 260 may be configured to operate in a mode which enables its proximity to other mesh devices to be determined. The smartphone 260 can be configured to periodically transmit a "proximity event" packet, which is a mesh packet that has a TTL at a predetermined value (e.g. zero). As mentioned above, any mesh device that receives a mesh packet that has a TTL of zero it will not retransmit that packet. The proximity event packet may have a payload that comprises information such as an identifier for the smartphone 260 and/or an indication of packet type, such as a proximity event packet type. This allows mesh devices that receive the proximity event packet to determine that the smartphone 260 is physically located near to those devices. For example, light 250 may be within transmission range of the smartphone 260 and able to receive the proximity event packet. As the proximity event packet has a TTL of zero and the payload comprises information that indicates its packet type, the light 250 is able to determine that the packet was directly received from the smartphone 260 and it was not relayed via another mesh device. Thus the light 250 is able to determine that the smartphone 260 is nearby.

In response to receiving the proximity event packet, the light 250 can then generate and transmit a "proximity report" packet. This packet can let the other devices in the mesh network 100 know that the light 250 is near to the smartphone 260. So that the proximity report can be sent to the other devices in the mesh network, the TTL has a value that is greater than one so that it can be retransmitted by at least one device. The proximity report packet can comprise a payload having information such as an identifier for the smartphone 260, an identifier for light 250, the region associated with the light (e.g. a group identifier), an indication of the proximity of the smartphone 260 to the light 250 and/or other information.

In some cases, a device may decide not to generate and transmit a proximity report in response to receiving a proximity event packet. This may be the case when, for example, the device has previously received a proximity event packet and has recently sent a proximity report having the same or similar information. Thus, a mesh device may be configured to transmit proximity reports in dependence on previous reports that it has transmitted. This is would help avoid flooding the mesh network with proximity reports.

The proximity report from light 250 may reach switch 170 (e.g. via relaying by lights 220, 130 and 150) which can control the lights in room 100. The switch 170 may be able to access and process the payload of the proximity report to allow it to determine that the smartphone 260 is near to light 250. The switch 170 may be configured to perform an action on the basis of this information. For example, the switch 170 is associated with room 100 and it determines that the smartphone is in room 200 because light 250 is associated with that room, and thus the switch 170 decides to turn from on to off (or remain off) so that the lights in room 100 are switched off.

In another example, devices 220 and 250 may both receive a proximity event packet from the smartphone 260 (from the same transmission by the smartphone 260 or transmissions at different times). Devices 220 and 250 may each be capable of determining a measure of proximity from the device 220 or 250 to the smartphone 260 by receiving the proximity event. The devices 220 and 250 may be able to form a measure of the proximity by, for example, measuring the signal strength (e.g. RSSI) of the received proximity event. Other measures may be used such as signal phase, signal quality and/or signal error of the received proximity event. The devices 220 and 250 could also respond to the proximity event message so that signal roundtrip time can be determined as a way of measuring the proximity.

Device 220 then generates and transmits its proximity report and so does device 250. The devices 220 and 250 then receive each other's reports (e.g. directly from each other or relayed via another device, e.g. smartphone 260). Device 220 can then compare the RSSI contained in the proximity report from light 250 with the RSSI determined from the proximity event from the smartphone 260 and determine if it is closer to or further from the smartphone 260 than light 250. Light 250 can also carry out a similar comparison. If, for example, light 220 determines that it is closer to the smartphone 260 than light 250, then it may switch itself (or remain) on. Correspondingly, light 250 may determine that it is further than light 220 and switch itself (or remain) off. Alternatively, rather than light 250 automatically switching itself off, light 220 can generate and send a mesh packet that instructs light 250 to switch off.

Further devices, such as switch 270, light 210, etc may also detect the proximity event from the smartphone 260 and then each send their proximity reports. The proximity reports can be processed and/or relayed by other devices in the mesh network 300. In this way, devices in the network 300 can collate the information in the proximity reports and learn the proximity of other devices to the smartphone 260. Based on this collated information, the devices may carry out actions. For example, light 210 may collate reports from lights 220, 240, 250 and compare the RSSIs for each of those lights. Based on this, light 210 may, for example, determine that it has the highest RSSI and therefore it is the closest light to smartphone 260. Light 210 may then transmit a packet that instructs the other lights to switch off. Light 220, however, may also have collated the RSSIs of lights 220, 240, 250 as well as 210 and its own RSSI value. From this, light 220 may determine that it is closer to smartphone 260 than light 210. Thus, when light 220 receives the packet that originated from light 210 that instructs the lights to switch off, light 220 can disregard this instruction and turn itself (or remain) on. Light 220 can then respond to the instruction informing the other lights that the instruction was disregarded and that light 220 is in fact the closest and thus light 210 will turn itself off when it receives the response.

A device may be configured to generate a proximity report if the proximity indication derived from the proximity event packet is above a predetermined threshold. For example, light 130 may receive the proximity event from smartphone 260. From the received proximity event, a weak RSSI may be determined. Thus, the light 130 may decide that it is not to generate a proximity report. The decision may be based on the RSSI not meeting a predetermined RSSI threshold level. In some circumstances, the light 130 may decide later that it is to generate and transmit the proximity report. For example, if the light 130 does not receive a proximity report from another device that indicates the proximity of the smartphone 260 to that other device, then the devices in the mesh network may not be aware of the presence of the smartphone 260. Thus, even if the RSSI threshold is not met, the light 130 may wait for a predetermined amount of time to see if it receives any other proximity reports and if it doesn't, then it can generate and send a proximity report for the smartphone 260. The predetermined waiting time may be dependent on the number of mesh devices surrounding each device. For example, if surrounded by a relatively low number of devices, mesh packets may take longer to reach a device and thus the predetermined time should be longer compared to a device that was surrounded by a relatively high number of devices.

A device may select a RSSI threshold level in dependence on the number and/or proximity of neighbouring devices. For example, a large area may comprise a relatively small amount of mesh devices and thus the RSSI threshold may be lowered for those devices to effectively increase their "detection area" so that when a portable device that broadcasts the mesh event packets enters that area it's presence and proximity can be detected, which is then reported to other mesh devices. On the other hand, a small area comprising a relatively large amount of mesh devices would benefit from an RSSI threshold that is higher for those devices. This would act to limit the number of proximity reports generated, transmitted and relayed throughout the mesh network, thus saving power throughout the mesh.

A device may use the proximity event and proximity report packets to determine which other mesh devices are located proximate to that device. This way, the fixed devices can determine the density of devices around them and report that determination to other devices. Devices may set or adjust its RSSI threshold or predetermined waiting time depending on this determination. Devices which have a fixed physical location may allow other devices to determine their surroundings by transmitting the proximity event packet on initialisation, periodically or upon instruction. Proximity reports generated in response to receiving a proximity event packet can then be shared with other devices so that each device may be able to determine a local or regional topology.

Proximity reports that are generated and transmitted as a result of portable and/or fixed devices transmitting proximity event packets may be received at a mesh network management device which can collate the reports to determine a global topology that provides a relative measure of the proximity of each mesh device relative to other mesh devices. Each proximity report maybe considered to be partial information about the topology of the network. By collating and processing increasing numbers of proximity reports from various sources, a more detailed and accurate global topology can be determined.

In one alternative example, information about the topology of a mesh network could be determined by observing how a proximity event message with a low TTL value (e.g. one or two) propagates throughout the network.

Proximity reports generated in response to directly or indirectly receiving the proximity event messages could be collated by the network management device and processed to determine topology information. Based on the topology information, the mesh management device may determine actions that are to be carried out by some or all of the devices in the mesh network. For example, the mesh management device may optimise the amount of power consumed by each device in the mesh whilst listening for mesh messages by analysing the topography information to determine an optimal listening time for each device and then sending instructions to each device to adjust its listening time.

The mesh network management device may be a device such as the smartphone which is physically located in the region of the mesh devices or it may be a server that is located outside the coverage area of the mesh network and is able to send and receive mesh message via a bridge (as described above with respect to FIG. 2). The mesh management device can send messages that cause certain devices to perform certain actions based on the collated proximity information and other information about the devices (e.g. what region they are in). For example, the smartphone 260 may have information about which room each device is associated with in the mesh network. The devices in the mesh network 300 may transmit proximity event packets, which allows the smartphone 260 to determine that it is in room 200 based on a higher RSSI from devices in room 200 than from devices in room 100. Consequently, the smartphone 260 can then generate and transmit a packet that instructs the devices in room 100 to switch off.

As mentioned above, receiving a proximity event packet provides an indication of proximity of the transmitting device to the receiving device. This indication may be that the transmitting device is present somewhere in a particular area (e.g. in a particular part of a building). By measuring characteristics of the signal from the transmission of the proximity event packet, further information may be derived. E.g. a device may measure RSSI to estimate the distance between the transmitting and receiving devices.

The RSSI value or a distance calculation from the RSSI value could be used to determine how close a transmitting device is to the receiving device. Multiple devices may measure the RSSI and share those measurements (via proximity reports) to help trilaterate the location of the transmitting device.

Additional proximity information from other sources (e.g. detecting Wi-Fi access points, etc) could be combined with the proximity information from the proximity event packet and sent to other mesh devices in the proximity report packet.

One or more devices in the mesh network (e.g. the smartphone 260) may be capable of providing information that may be used to determine its absolute location, for example, an image of a bar-code indicating location, information from a Global Navigation Satellite System (GNSS), a location obtained by triangulating signals from cell-phone transmitters, or information manually provided by a user such as a position on a map. The absolute location information may be combined with the relative proximity information that is determined from proximity reports so that absolute locations of other mesh devices can be estimated.

Figure 5:
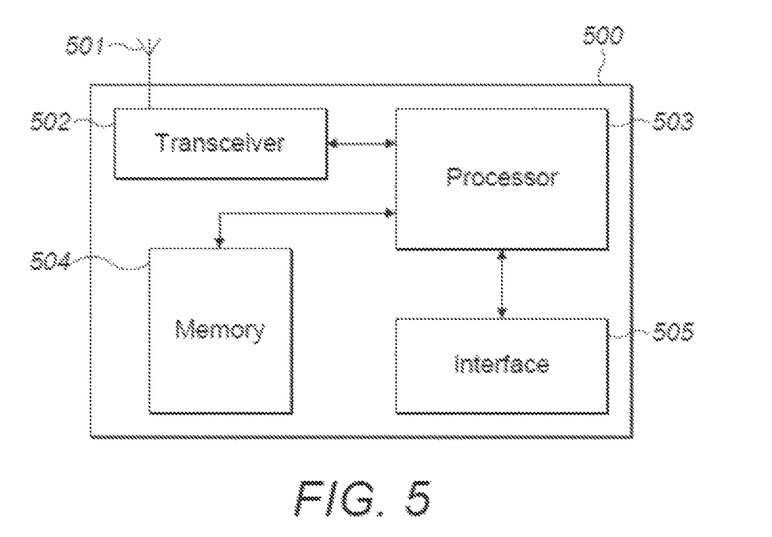
FIG. 5 shows a schematic diagram of an example wireless communications device.

As mentioned above, each of the objects (lights, switches, etc) comprises a wireless communication device that enables the object to communicate over a wireless communications protocol. FIG. 5 shows a schematic diagram of an example wireless communication device 500. The device 500 may comprise an antenna 501 connected to a transceiver 502. The device 500 can use the transceiver 502 to communicate with at least one other communication device according to the communications protocol. The device 500 may also comprise a processor 503 that is capable of executing a set of program instructions that may be stored in a memory 504. The memory 504 can be a non-volatile memory that stores in non-transitory form program code that is executable by the processor 503 to cause the device 500 to communicate according to the communications protocol and to carry out the proximity determination processes described herein. The memory 504 may also store data such as proximity estimates (e.g. RSSI data or data derived therefrom) and data from received proximity reports.

The processor 503 can be a microprocessor. The memory 504 may be part of processor 503 or connected to processor 503 via a bus. Whilst the processor 503 and transceiver 502 are shown in FIG. 5 as separate elements, it will be appreciated that at least processor 503 and transceiver 502 could be incorporated into one element, for example, being incorporated on a single chip.

The device 500 may also comprise a power source (not shown). The power source may be a battery. Alternatively, the device 500 may not comprise a power source and be connected to an external power source such as an electrical outlet.

The communication device also comprises an interface 505 for sending and receiving data that is sent and received using the communications protocol. A higher layer entity, e.g. an object controller, which may be an application, can provide higher layer message data via the interface 505 for sending via the protocol. Higher layer message data from a received packet can be provided to, e.g. the controller, via the interface 505. The interface 505 may be a wired link. The wired link may be to sensors for sensing external events, such as the operation of a light switch in the home environment described above, or a link to appliances for issuing control signals to those appliances, such as the light in the home environment described above.

The devices described herein may be wireless communication devices that operate according to the same wireless communication protocol. The wireless communication protocol could be a relatively short-range protocol. For example the effective range of each device could be less than 25 m. That characteristic can permit the devices to use less power for transmitting and/or receiving than would be expected in a longer range protocol. In one example, the devices could operate according to the Bluetooth protocol, specifically the Bluetooth Low Energy (BLE) protocol. The devices could use other protocols, for instance IEEE 802.11 or ZigBee.

The devices described herein may comprise secondary communication interface that supports a different, second, physical and/or logical communications protocol from the one that is used for communicating over the mesh network. Examples of the protocols that could be supported by the secondary communication interface include wireless protocols such as those mentioned above and also wired protocols such as Ethernet, USB or HomePlug.

The devices described herein could form a mesh network with other wireless communication devices. The devices could be configured to forward some or all messages they receive. The messages could be sent and received via a broadcast packet type defined in the wireless communication protocol. All the devices in the network could be peers in that they have identical roles at a network level.

The devices configured in accordance with the examples described herein could be embodied in hardware, software or any suitable combination of hardware and software. The receiving device of the examples described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing system, and/or heterogeneous processors comprising one or more dedicated, programmable and general purpose processing functionalities. In the examples described herein, the devices comprise one or more processors and one or more memories having program code stored thereon, the data processors and the memories being such as to, in combination, provide the claimed data processing systems and/or perform the claimed methods.

Data processing units described herein (e.g. processor 503) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

Any one or more of the methods described herein could be performed by one or more physical processing units executing program code that causes the unit(s) to perform the data processing methods. Each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method of determining a proximity of a first device to a second device, the method comprising:
receiving at the second device from the first device a first packet including a first payload and a first lifetime value, the first lifetime value to prevent the second device from retransmitting the first payload; and
generating, based at least in part on the first packet, a second packet including a second payload and a second lifetime value, wherein:
the second payload including a first signal strength value indicating the proximity of the first device to the second device and a group identifier indicating a region associated with the second device;
the second lifetime value to enable a third device receiving the second packet to retransmit the second payload; and
the second packet is generated in response to a determination that the first signal strength value is less than a predetermined threshold and a determination that the second device has not received a packet from another device indicating a proximity of the first device to the other device within a predetermined duration of time after receiving the first packet.

2. The method of claim 1, wherein the second payload includes an identifier for the first device and an identifier for the second device.

3. The method of claim 1, further comprising:
generating, by the second device, a third packet to enable one or more other devices to perform an action based at least in part on the first signal strength value.

4. The method of claim 3 further comprising:
at a fourth device, receiving the first packet and the third packet; and
disregarding the third packet based at least in part on the first packet.

5. The method of claim 4, further comprising:
at the fourth device, transmitting a fourth packet including a message indicating that the third packet has been disregarded.

6. The method of claim 1, further comprising:
receiving, at the second device, a third packet including a third payload and a third lifetime value based at least in part on the first packet, the third payload including a second signal strength value indicating a proximity of the first device to a fourth device and the third lifetime value enabling another device receiving the third packet to retransmit the third payload; and
comparing the second signal strength value with the first signal strength value.

7. The method of claim 6, further comprising:
generating a fourth packet based at least in part on the comparison of the first signal strength value to the second signal strength value, the fourth packet comprising a payload enabling another device to perform a first action.

8. The method of claim 7, further comprising:
performing a second action based at least in part on the comparison of the first signal strength value to the second signal strength value.

9. The method of claim 1, further comprising:
receiving, at a fourth device, the first packet comprising an identifier for the first device; and
generating a third packet in response to a determination that the fourth device receives the second packet, the third packet including a third payload and a third lifetime value based at least in part on the first packet, the third payload including a second signal strength value indicating a proximity of the first device to the fourth device and the third lifetime value to enable a device receiving the third packet to retransmit the third payload.

10. The method of claim 1, further comprising:
determining at least one of the group consisting of a signal round-trip time, a signal arrival time, a signal quality, and signal error associated with the first packet.

11. The method of claim 1, wherein the first and second devices communicate via a mesh network.

12. The method of claim 1, wherein the first and second devices operate in accordance with a wireless communications protocol that defines a broadcast packet type.

13. The method of claim 12, further comprising:
receiving a first broadcast packet of the broadcast packet type, the first broadcast packet comprising the first packet; and
broadcasting a second broadcast packet of the broadcast packet type, the second broadcast packet comprising the second packet.

14. The method of claim 13, wherein the wireless communication protocol is a Bluetooth low energy protocol.

15. A wireless communication device comprising:
a transceiver configured to receive, from a first device, a first packet including a first payload and a first lifetime value, the first lifetime value configured to prevent the wireless communication device from retransmitting the first payload; and
a processor configured to process the first packet and generate, based at least in part on the first packet, a second packet including a second payload and a second lifetime value, the second payload including a signal strength value to indicate a proximity of the first device to the wireless communication device, a group identifier to indicate a region associated with the wireless communication device, and the second lifetime value configured to enable a third device receiving the second packet to retransmit the second payload,
wherein the processor is further configured to generate the second packet in response to a determination that the signal strength value is less than a predetermined threshold and a determination that the wireless communication device has not received a packet from another device indicating a proximity of the first device to the other device within a predetermined duration of time after receiving the first packet.

16. A communications system comprising:
a first device configured to transmit a first packet including a first payload and a first lifetime value, the first lifetime value configured to prevent a second device receiving the first packet from retransmitting the first payload, and
a second device configured to receive the first packet and generate, based at least in part on the first packet, a second packet including a second payload and a second lifetime value, the second payload including a signal strength value to indicate a proximity of the first device to the second device, a group identifier indicating a region associated with the second device, and the second lifetime value configured to enable a third device receiving the second packet to retransmit the second payload,
wherein the second device is further configured to generate the second packet in response to a determination that the signal strength value is less than a predetermined threshold level and a determination that the second device has not received a packet from another device indicating a proximity of the first device to the other device within a predetermined duration of time after receiving the first packet.

17. The communications system of claim 16, comprising:
a plurality of wireless nodes within a predetermined area configured to form a mesh network, each wireless node associated with a region within the predetermined area, wherein:
the second device is a first wireless node of the plurality of wireless nodes; and
a second wireless node of the plurality of wireless nodes is configured to receive the second packet and perform an action based at least in part on the second packet and the region associated with the second wireless node.

18. The communication system of claim 17 comprising:
a management device configured to communicate in the mesh network, the management device configured to generate a third packet including a payload configured to enable devices associated with a particular region to perform a particular action.

* * * * *